United States Patent
Welsh (10) Patent No.: US 6,832,973 B1
(45) Date of Patent: Dec. 21, 2004

(54) SYSTEM FOR ACTIVE NOISE REDUCTION

(76) Inventor: William A. Welsh, 35 Watson Ave., North Haven, CT (US) 06473

( * ) Notice: Subject to any disclaimer, the term of this patent is extended or adjusted under 35 U.S.C. 154(b) by 0 days.

(21) Appl. No.: 09/621,950

(22) Filed: Jul. 21, 2000

(51) Int. Cl.$^7$ .......................... H03B 29/00; G10K 11/16; B64C 27/00; F16H 57/00

(52) U.S. Cl. .................... 475/331; 381/71.4; 381/71.12; 700/280; 475/904

(58) Field of Search ................................. 475/331, 904; 181/206; 74/443, 640; 381/71.4, 71.12, 71.8, 71.14; 244/17.11, 17.13; 700/280

(56) References Cited

U.S. PATENT DOCUMENTS

| | | | |
|---|---|---|---|
| 2,361,071 A | 10/1944 | Vang | 188/1 |
| 4,562,589 A | 12/1985 | Warnaka et al. | 381/71 |
| 4,715,599 A | 12/1987 | Fuller | 244/1 |
| 5,083,474 A | 1/1992 | Rouverol | 74/461 |
| 5,300,848 A | 4/1994 | Huss et al. | 310/83 |
| 5,310,137 A | 5/1994 | Yoerkie, Jr. et al. | 244/17 |
| 5,315,790 A | 5/1994 | Kish et al. | 51/165 |
| 5,341,699 A | 8/1994 | Rouverol | 74/462 |
| 5,423,658 A | 6/1995 | Pla et al. | 415/118 |
| 5,453,943 A | 9/1995 | Magliozzi | 364/574 |
| 5,472,386 A | 12/1995 | Kish | 475/338 |
| 5,485,761 A | 1/1996 | Rouverol | 74/462 |
| 5,526,292 A | 6/1996 | Hodgson et al. | 364/574 |
| 5,551,650 A | 9/1996 | Southward et al. | 244/54 |
| 5,554,899 A | 9/1996 | Teramachi | 310/80 |
| 5,625,276 A | 4/1997 | Scott et al. | 322/24 |
| 5,716,300 A * | 2/1998 | Sammataro et al. | 475/346 |
| 5,732,905 A | 3/1998 | Krysinski | 244/17.27 |
| 5,789,678 A | 8/1998 | Pla | 73/660 |
| 5,802,921 A | 9/1998 | Rouverol | 74/458 |
| 5,845,236 A * | 12/1998 | Jolly et al. | 702/195 |
| 5,853,144 A | 12/1998 | Vincent | 244/17 |
| 5,874,797 A | 2/1999 | Pinkerton | 310/156 |
| 5,895,012 A | 4/1999 | Krysinski et al. | 244/17.13 |
| 5,983,753 A | 11/1999 | Kostiza | 74/640 |
| 6,138,947 A * | 10/2000 | Welsh et al. | 244/17.27 |
| 6,254,504 B1 * | 7/2001 | Goi et al. | 475/216 |

OTHER PUBLICATIONS

NASA Technical Memorandum 106952, AIAA–95–3050, Army Research Laboratory Technical Report ARL–TR–778, "Influence of Tooth Profile Modification on Spur Gear Dynamic Tooth Strain", pp. 1–9, Jul. 1995.

Active 99, entitled: "Active Control of Gearbox Vibration", by B. Rebbechi, C. Howard, and C. Hansen, pp. 295–302, 1999.

* cited by examiner

Primary Examiner—Rodney H. Bonck (57) ABSTRACT

An apparatus and method to minimize acoustic vibration in a vehicle due to impulsive gear clash loads. Sensors are mounted on the vehicle and are used to sense vehicle vibration generated by the gear clash loads. A first gear, having a plurality of teeth and a second gear, also having a plurality of teeth, are disposed such that upon rotation of the first and second gears, certain ones of the second gear teeth mesh with certain ones of the first gear teeth. An actuator, which is coupled to the first gear, drives the first gear and generates torque pulses. A controller is coupled to the actuator and controls the torque pulses that are transmitted to the first gear. The torque pulses generated by the actuator are adjusted in magnitude and phase so that the first gear teeth vibrate at a predetermined frequencies thereby reducing vibrations and peak tooth loading caused by the meshing of the first gear teeth and the second gear teeth.

11 Claims, 9 Drawing Sheets

SYSTEM FOR ACTIVE NOISE REDUCTION

BACKGROUND OF THE INVENTION

1. Field of the Invention

This invention relates generally to decreasing audible noise caused by engagement between meshing gear teeth, as typically encountered in, for example, helicopters. More particularly, this invention relates to decreasing cabin noise in helicopters using an actuator to generate compensating torque pulsations that are transmitted to a meshing gear. The invention also relates to evenly distributing loads on a gear, such as a helical gear, spur gear, pinion gear or bull gear, thereby minimizing impulsive gear loading on each gear tooth.

2. Brief Description of the Art

Interior noise control (i.e., cabin noise control) is a primary concern in the operation of vehicles with rotor assemblies, such as helicopter. The noise is created by operation of the main rotor assembly during flight of the helicopter and results in the generation of "low frequency" vibrations (i.e., frequencies less than approximately 300 Hz). Additionally, the operation of the main transmission of the helicopter generates "high frequency" vibrations (i.e., vibrations having a frequency between approximately 300 to 1000 Hz).

A major source of the high frequency vibrations is due to meshing between mutually engaging and rotating gear teeth. The gear teeth meshing causes unwanted multi-frequency noise in the vehicle cabin. This noise, aside from making the cabin environment unpleasant, makes understanding speech, and thus conversation, difficult. Gear tooth impact is a mechanical meshing of two inter-engaging gears that creates an undesired vibration, which is transmitted through the bearings to a gearbox housing. This undesired vibration is repetitive and periodic because there are typically multiple teeth on each gear. Since the gearbox is bolted to the airframe of a vehicle, the vibratory stresses are transmitted to the airframe, through the gearbox mounts, and produce acoustic noise, which is a function of the acoustic vibration, in the cabin of the vehicle. Although acoustic vibrations can be measured using a sensor, such as a strain gauge or other suitable vibration sensor, they are very difficult to correct.

U.S. Pat. No. 5,310,137, issued to Yoerkie, Jr. et al., entitled, "Helicopter Active Noise Control System" relates to an active noise control system (ANC) for a helicopter that is operative to effectively nullify one or more high frequency vibrations emanating from a main transmission gearbox at the gearbox/airframe interface. The ANC system includes modified transmission beams that are mechanically stiffened to function as rigid bodies with respect to high frequency vibrations.

U.S. Pat. No. 5,526,292, issued to Hodgson et al., entitled, "Broadband Noise And Vibration Reduction" relates to an active noise and vibration cancellation system with broadband control capability. A broadband disturbance signal detector positioned within a closed compartment, such as an aircraft cabin or vehicle passenger compartment, provides a signal representative of the frequency spectrum and corresponding relative magnitude of a broadband signal emanating from a vibrational energy source to a controller. The controller receives the broadband disturbance signal and error signals from error sensors that enhance the cancellation capability of the control signals produced by actuators that are positioned within the compartment.

U.S. Pat. No. 5,853,144, issued to Vincent, entitled, "Helicopter And Method For Reducing Vibration Of A Helicopter Fuselage" relates to a helicopter structure with a fuselage, rotating system parts capable of relative motion at an exciting frequency and a plurality of actuators. A plurality of sensors are attached to the rotating system at selected locations. Processing means are adapted to process signals from the sensors and provide output signals for controlling the phase and magnitude of applied forces generated by the actuators to reduce the overall level of vibration in the fuselage.

U.S. Pat. No. 5,485,761, issued to Rouverol, entitled, "Articulated Differential Crowning" relates to a system of modifications for power train gearing. The gear teeth are modified in an attempt to eliminate transmission error at all loads so that the dynamic increment of load is also eliminated at all loads.

However, none of the above-cited patents adequately reduce noise in a vehicle cabin due to impulsive gear clash loads such as encountered in helicopter operation.

One conventional approach to reduce acoustic vibration produced in a vehicle gearbox is to modify the gear tooth design in an attempt to reduce impact, e.g., utilize a herring bone gear, which is a gear with a more complex gear tooth design. Unfortunately, this gear design has been found not to sufficiently decrease acoustic noise. Also, straight spur gear teeth have been used, although less expensive to manufacture, these gears tend to separate under force, which is unsatisfactory.

A second conventional approach to reduce the acoustic vibration produced in a vehicle gearbox, and thus acoustic noise, is to isolate the gearbox from the vehicle airframe. One such isolation technique utilizes vibration isolators, for example, rubber pads disposed between the gearbox and the airframe to isolate the gear clash loads produced in the gearbox. Unfortunately, static loads on the vehicle cause deflection of the gearbox during flight deforming the rubber pads between the gearbox and the airframe thus causing the airframe and gearbox to experience movement relative to each other. This movement can bind control rods, which are mounted between the gearbox and the airframe, causing the control rods to deform or otherwise become damaged or to inadvertently apply anomalous controls to the main rotor. Additionally, when the gearbox experiences movement, the alignment of the drive shaft may be altered such that the drive shaft experiences undesired movement as a result of the vibration. This undesired movement can cause the drive shaft to bind, deform, bend or otherwise become damaged.

Thus, padding materials that are suitable to absorb the vibratory loads between the gearbox and the airframe can result in undesired movement that can bind or damage control rods and/or drive shaft(s).

A third conventional approach to reduce acoustic vibration produced in a vehicle gearbox is to mount special active noise cancellation (ANC) actuators between the gearbox and the airframe at each possible load path. This method is expensive to implement because there are typically a large number of load paths. For example, in the S-76™ helicopter (S-76 is a trademark of Sikorsky Aircraft, a division of United Technologies Corporation) the number of load paths is 24; (4 gearbox mounting feet×6 motions per foot=24), which requires up to 24 ANC actuators. Moreover, the actuators can usually only effectively reduce one frequency of a multi-frequency vibration thus allowing other frequencies of the vibration to pass into the cabin unmitigated. Each actuator has a directed cost, which is the actual cost of the actuator, as well as indirect costs, which are due to the additional mass of each actuator and the associated additional power demands on the vehicle. Thus, the use of more than the minimum number of actuators is undesirable.

A fourth conventional approach to reduce vibrations produced by a vehicle gearbox is to place a polymer material, such as an elasto-polymer or foam rubber, in the gearbox, on the gears or gearbox housing surface, to absorb vibration. However, the gearbox environment also includes fluids necessary for lubrication, such as transmission fluid, that degrade such polymer materials rapidly, thereby diminishing the effectiveness of such materials to absorb vibration. Thus, the environment of the gearbox interior makes this approach unsatisfactory.

A fifth conventional approach is an arrangement to reduce acoustic noise from gearboxes by applying transverse loads to the gear mounting bearings usually using piezoelectrical actuators. This method has several shortcomings. Most importantly, the meshing gears need to be firmly positioned relative to each other so that proper meshing occurs. This requires the mounting bearings and surrounding gearbox housing backup structure to be very stiff. This being the case, any actuator that attempts to move the mounting bearings or structure must produce prohibitively high loads to effectively reduce the gear tooth loads.

Thus, what is needed is a system to effectively reduce the acoustic vibration created by gearbox noise without compromising the structural relationship between the gearbox and the airframe or adding undesired mass and/or expense to the vehicle or by introducing large loads into the gearbox structure.

BRIEF SUMMARY OF THE INVENTION

The present invention relates to an apparatus and method to reduce acoustic vibration in a vehicle cabin or cockpit due to impulsive gear clash loads produced by gear teeth.

One embodiment of the instant invention is directed to an apparatus for reducing noise in a vehicle. The apparatus includes one or more sensors that are mounted on the vehicle and used to sense noise. A first gear, having a plurality of teeth and a second gear, also having a plurality of teeth, are disposed such that upon rotation of the first and second gears, certain ones of the second gear teeth mesh with certain ones of the first gear teeth. An actuator, which is coupled to the first gear, drives the first gear and generates torque pulses that are transmitted to the first gear. A controller is coupled to the actuator and controls the torque pulses that the actuator transmits to the first gear. The torque pulses generated by the actuator are electrically phased and magnitude adjusted so that the first gear teeth vibrate at a predetermined frequency thereby reducing vibrations caused by meshing of the first gear teeth and the second gear teeth.

Another embodiment of the instant invention is directed to a method for reducing vehicle vibrations caused by gearbox vibration. A first gear, which has a plurality of teeth, is rotated and a second gear, which also has a plurality of teeth, is rotated such that the first gear teeth and second gear teeth interact to produce impulse loads that are transmitted through support bearings to a gearbox housing. Vehicle vibrations, generated by the impulsive noise, are sensed and a command signal is generated, as a function of the sensed vehicle vibrations. The command signals are transmitted to an actuator. Pulsating torques are generated by the actuator in response to the command signals and transmitted to the first gear. The pulsating torques are electrically phased and magnitude adjusted to cause the first gear teeth to vibrate at a predetermined frequency, thereby reducing vibrations caused by meshing of the first gear teeth and second meshing. The steps of this method are suitably stored on a computer-readable medium.

Yet another embodiment is directed to an apparatus for reducing noise in a vehicle. This apparatus includes sensing means, mounted on the vehicle, for sensing noise. A first gear, having a plurality of teeth and a second gear, having a plurality of teeth, are disposed such that upon rotation of the first and second gears, certain ones of the second gear teeth mesh with certain ones of the first gear teeth. Actuator means are coupled to the first gear, for driving the first gear and for generating torque pulses that are transmitted to the first gear. Control means are coupled to the actuator means, for controlling the torque pulses that are transmitted to the first gear. The torque pulses generated by the actuator means are electrically phased and magnitude adjusted so that the first gear teeth vibrate at a predetermined frequency to minimize vibrations caused by the first gear teeth and the second gear teeth meshing.

Yet another embodiment of the instant invention is directed to a method and apparatus for generating pulsating torques to minimize impulsive loading on gear teeth by reducing variance between peek and non peak loads.

BRIEF DESCRIPTION OF THE DRAWINGS

Like reference numerals refer to like components throughout the several views.

DETAILED DESCRIPTION OF THE INVENTION

Research conducted at Sikorsky Aircraft has identified the sources primarily responsible for the high frequency interior noise levels of the S-76™ helicopter. In particular, such research has identified specific high frequency vibrations (i.e., frequencies between approximately 300 and 1000 Hz) emanating from the main transmission gearbox as the most significant source of such interior noise levels. A substantial majority of these high frequency vibrations are the result of the gearing interactions in the various gearing reduction stages, helical gearing, bevel gearing and spur gearing.

The instant invention is an improved apparatus and method to reduce vibrations produced in a gearbox due to gear teeth meshing. Gear systems, such as those used in a vehicle, for example, a helicopter, produce undesired noise when gear teeth come together and impact. A contributing source of this undesired noise is caused by the varying load each tooth experiences through the loading history of the gear. The present invention reduces both components (gear tooth impact and uneven loading on gear teeth) of the undesired noise.

In order to reduce gear tooth impact noise, the present invention utilizes actuators, which are typically brushless permanent magnet actuators, such as electric motors, to generate torque pulsations into one or more of the meshing gears. In order to reduce disparate gear tooth loading, the present invention increases the uniformity of gear tooth loading.

The current invention applies loads in the best possible direction, that is, in the torque direction which is the same tangential direction as the gear clash loads. In addition, this invention does not require loads large enough to deform stiff bearing support structures in the gearbox.

One or more actuators are used to generate torque pulsations, which are electrically phased and magnitude adjusted by a control computer to minimize the impulsive meshing loads. The instant invention enables the number of active noise control (ANC) actuators to be reduced, which reduces the manufacturing expense and also reduces the total vehicle mass. For example, when applied to the S-76 Sikorsky™ helicopter, the instant invention reduces the number of ANC actuators from the presently required 24, to two. This reduction in the number of ANC actuators is due to minimizing acoustic vibrations at the source (typically two sources) rather than after the acoustic vibrations have propagated to the gearbox housing. Since the instant invention reduces the source of impulsive contact loads, multiple frequencies of noise are reduced by single frequency operation of the actuator.

Figure 1:
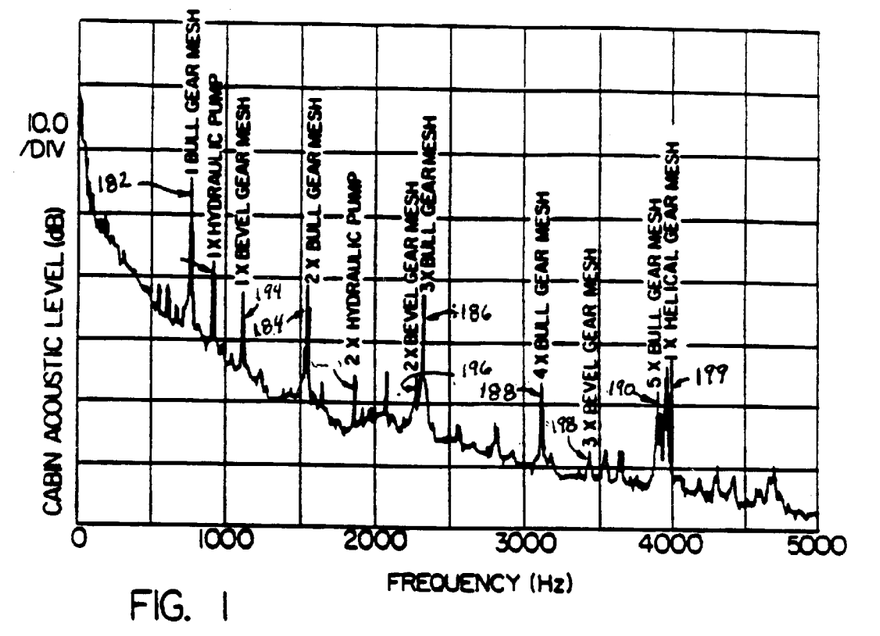
FIG. 1 shows a graph of the frequency spectra of the high frequency vibrations emanating from a vehicle main transmission gearbox.

Narrow band Fast Fourier Transform analysis, A-weighted octave levels, and overall dBA levels recorded in the cockpits and/or cabins of S-76A, S-76B and S-76C Sikorsky™ helicopters indicate that interior noise levels are predominately the result of vibrations occurring at the bull gear meshing frequency of 778 Hz. As illustrated in FIG. 1, graph 5 shows the bull gear meshing frequency 182 is approximately 780 Hz and the first, second, third, and fourth harmonics 184, 186, 188, 190, respectively, are approximately 1560 Hz, approximately 2340 Hz, approximately 3120 Hz, and approximately 3920 Hz, respectively. The bevel gear meshing frequency 194 is approximately 1140 Hz and the first and second harmonics 196 and 198, respectively, are of approximately 2280 Hz and 3420 Hz, respectively. The helical gearing meshing frequency 199 is approximately 3950 Hz. Thus, as shown by FIG. 1, the predominant amplitude of the high frequency vibration spectra emanating from the S-76™ main transmission gearbox is due to the bull gear. While the present invention is described in terms of a pinion and a bull gear, it also applies to a pinion driving ring gear and planatary gear systems.

Figure 2:
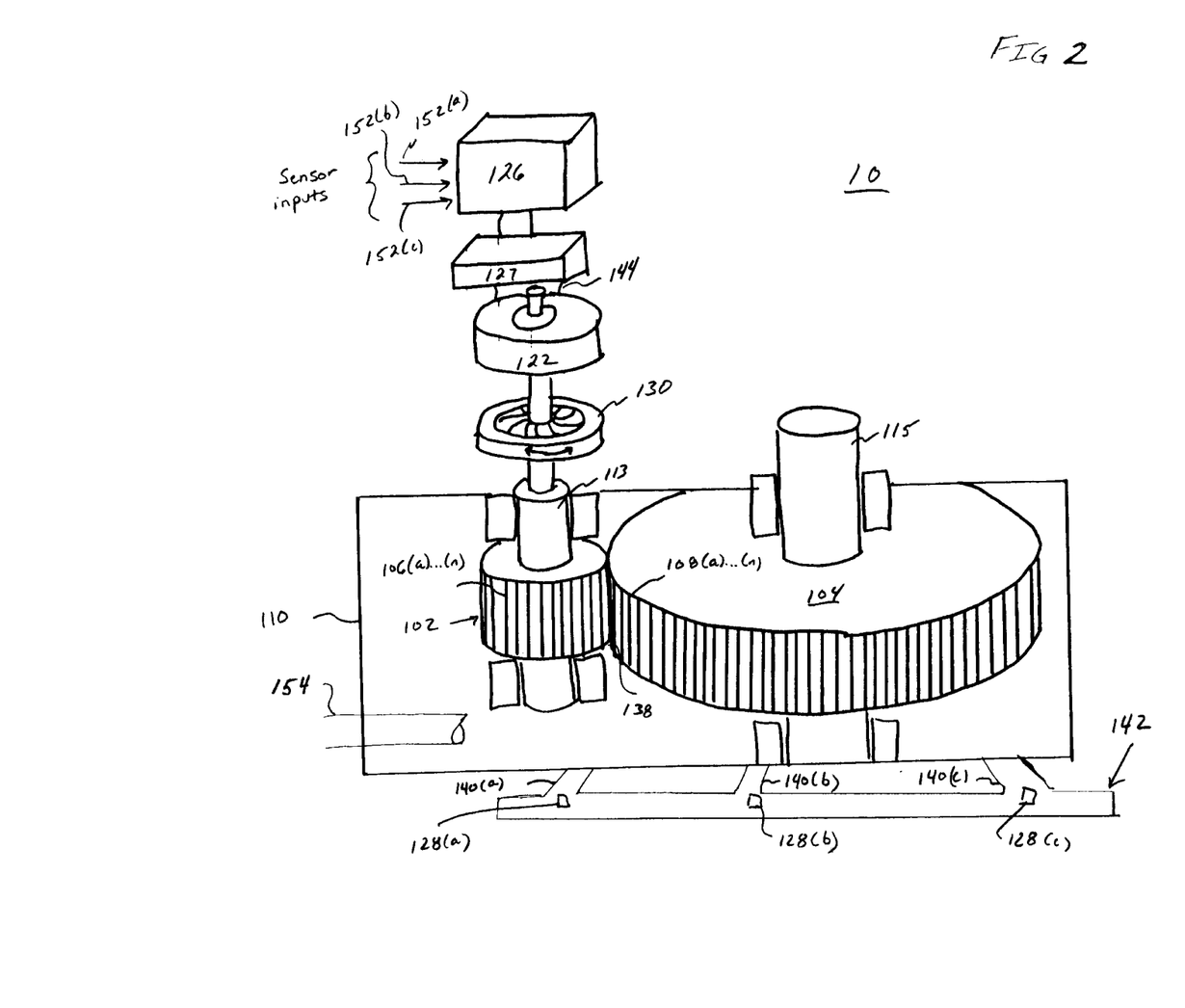
FIG. 2 shows the system of the instant invention.

As shown in FIG. 2, system 10 comprises a first meshing gear 102, a second meshing gear 104, a controller 126, an actuator 122, a resonant device 130, a gearbox 110 sensors 128(a) . . . (c) and a vehicle airframe 142. Each of these components is discussed in further detail below.

First gear 102, which is typically a pinion, has a plurality of first teeth 106(a) . . . (n) (where n is any suitable number that comports with the dimensions of pinon 102) mounted thereon. The first gear 102 has bearings 112 and 113 that connect the gear 102 to the gearbox housing 110. The first gear 102 rotates the second gear 104. Although only one first (pinion) gear 102 is shown, typically there are two pinions, one on each side of second (bull) gear 104.

Second gear 104, which is typically a bull gear, has a plurality of second teeth 108(a) . . . (n) (where n is any suitable number that comports with the dimensions of bull gear 104) mounted thereon. During operation of the system 10, first teeth 106(a) . . . (n) (generally 106) on pinion gear 102 mesh with second teeth 108(a) . . . (n) (generally 108) on bull gear 104 causing impulsive loads at the impact interface 138 as each tooth 106 of the pinion gear 102 contacts a mating gear tooth 108 of the bull gear 104. The impulsive loads are transmitted into the gearbox housing 110 through support bearings 112. The gearbox housing 110 transmits these vibrations to the airframe 142 via the gearbox mounting feet 140(a) . . . (c) causing unwanted noise in the vehicle cabin.

The controller, also referred to as a control module 126 herein, includes a microprocessor, which may be digital or analog. The microprocessor may be, for example a Pentium III processor at 650 megahertz (MHz) and 20.4 gigabytes (GB) of memory. The controller 126 utilizes one or more algorithms, which are typically stored in memory, or downloaded from a remote location, and inputs 152(a) . . . (n) received from sensors 128 to generate control command signals (both d.c. and a.c.) to cause pulsating torques in the actuator 122. The command signals and resulting pulsations may be at multiple frequencies. For example, on the S-76™ aircraft, the pulsations would be primarily at 778 Hertz (Hz). Since the frequency has a high magnitude, for example, greater than approximately 300 Hz, the resulting motor vibratory torques will have a low magnitude, for example, less than approximately 1.0 ft pound due to the attenuated response typical of electric motors at these high frequencies. Optionally, the pulsating torques can be routed into a resonant device 130 for amplification. The amplified torque then passes into the mating gear teeth 106 of pinion gear 102, causing them to vibrate so as to minimize the impulsive contact loads at interface 138. This reduction of the impulsive contact load yields multi-harmonic noise reductions. The control module 126 processes the signals 152 received from the sensors 128 and produces output signals, via amplifier 127, for controlling the actuator 122, via interconnectors 144. Interconnectors 144 are typically bidirectional power transmission wires.

Sensors 128(a) . . . (n) (generally 128) provide input signals 152(a) . . . (n), respectively to control module 126. (Each sensor 128 provides an associated input signal 152.) The sensors 128 are for example, accelerometers, strain gauges or microphones. Although only three sensors are shown in FIG. 2, there are typically any suitable number of sensors 128. Each sensor 128 is mounted in an operational relationship with the control module 126, although the sensors 128 may be located remotely from control module 126. For example, the sensors 128 are typically mounted in the vehicle cabin, or on the vehicle airframe 142 while the control module 126 may be mounted in the vehicle electronics compartment. Alternatively, the control module 126 may be mounted in the passenger compartment or cockpit.

The instant invention utilizes actuator 122, which is typically a brushless motor, that is connected in a collinear fashion with one of the meshing gears 102, 104. The actuator 122 is commanded by the controller 126. A rotating portion of actuator 122 is rotated by pinion 102 and it provides vibratory torque by pulsating control current from amplifier 127. This vibratory torque is transmitted to pinion 102 to decrease gear impact at gear interface 138. In order to counteract the impact and gear tooth variation, the actuator 122 produces torque to counteract these forces. Typically an actuator 122, such as an electric motor, cannot produce sufficiently large vibratory torque at 778 Hz; therefore, the actuator 122 must produce small torques, at frequency at 778 Hz.

Resonant device 130, which is typically a spring loaded system with a rotational mass, amplifies the small torque produced by actuator 122 to a larger magnitude torque, typically by a factor of between approximately 10 and 100 times, which results in an amplification to between 10 to 100 ft. pounds.

Gearbox 110 is used to house the pinion gear 102 and the bull gear 104. The gearbox 110 is mounted to the vehicle airframe 142 by attachment feet 140(a) . . . (c). Shaft 154 is used to connect the pinion 102 with the engine (not shown) of the vehicle through a bevel gear (not shown).

It should be noted that electric power can be extracted from the actuator 122 by regeneration to supply operating power to the controller 126 and/or amplifier 127. This arrangement has the benefit of enabling the controller 126 to be isolated from the vehicle electrical system and therefore not requiring expensive and heavy electrical filtering required to avoid electromagnetic interference (EMI).

An additional benefit of the invention is reduction in contact loads on the gear teeth 106, 108, which increases gear life and gearbox steady torque capacity.

Figure 3:
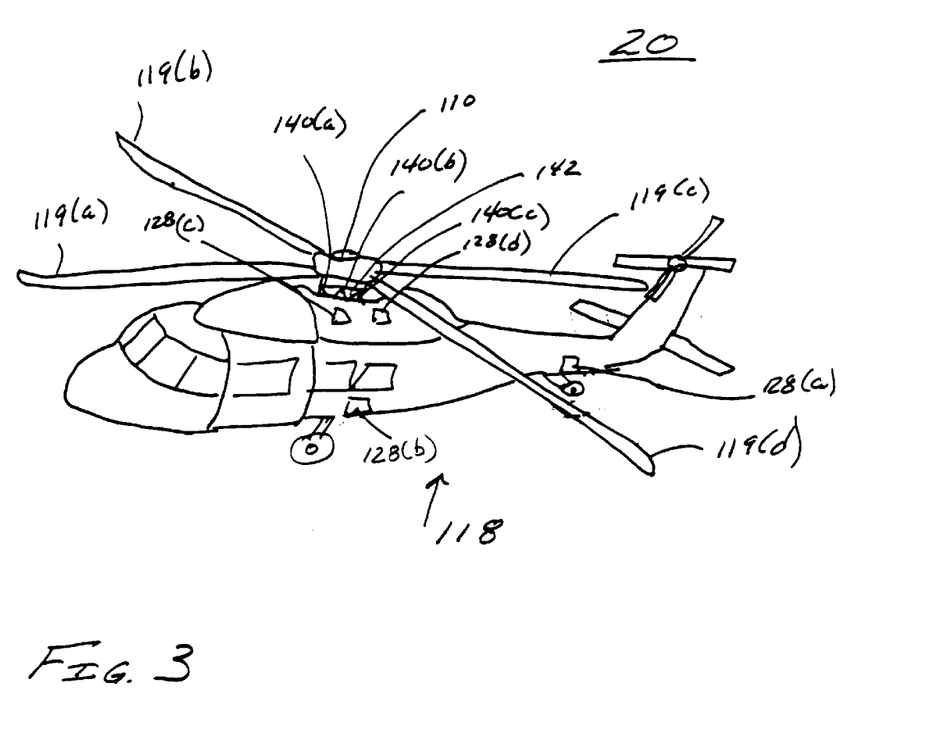
FIG. 3 shows a helicopter having the system as shown in FIG. 2.

FIG. 3 shows a perspective view 20 of a vehicle 118 that includes the pinion gear and bull gear configuration shown in FIG. 2. Vehicle 118, which is typically a helicopter, has rotor blades 119(a) . . . (d). Gearbox housing 110 is mounted at an upper portion of vehicle 118. Gearbox mounting feet 140(a) . . . (c) (generally 140) provide a mechanism for affixing gearbox housing 110 to vehicle airframe 142. Sensors 128(a) through (d) (generally 128) are used to sense acoustic vibration produced by the gears. Although only four sensors are shown, there are typically any suitable number of sensors necessary to provide sufficient feedback to the controller. The sensors 128 may be mounted in the vehicle cabin, on the gearbox mounting feet 140, or to the airframe 142, or to another location on the vehicle 118 that enables vehicle vibrations or acoustic noise to be sensed. Sensors 128 are typically microphones, accelerometers or other sensing devices that are capable of sensing vibration produced by gear clash from the gearbox 110 and generating a signal as a finction of the sensed vibration. These sensors generate electrical signals (voltages), 152(a) . . . (c), that are proportional to the local noise or vibration.

Figure 4:
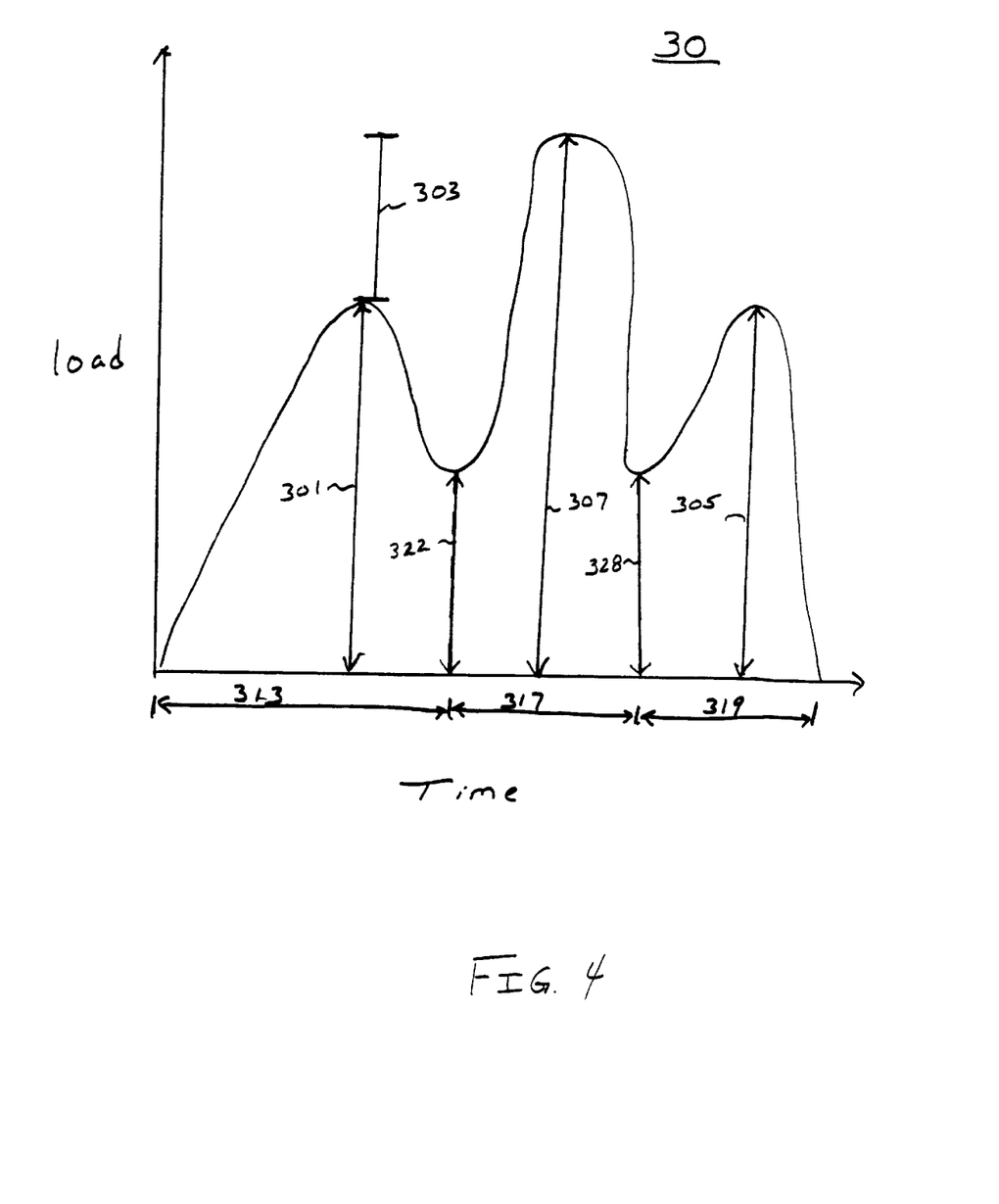
FIG. 4 shows a load distribution on a gear tooth.

FIG. 4 shows a graph 30 of a load on a particular gear tooth, as described above, which interacts with other gears, over time. An unsteady loading on each tooth of a gear is a contributing source of noise. Therefore, in order to reduce noise due to gear clash impact, this invention reduces impact of individual gears and therefore decreases the associated noise. This invention also reduces the amount of peak load on a gear tooth. This permits the gear to be smaller in size and have less mass than a gear that is subjected to a higher peak load. As shown in FIG. 4, the load on each gear tooth is not steady during the load cycle. Teeth on the bull gear interact with teeth on the pinion gear, i.e., meshing, thereby producing undesired loading variations and vibrations. The Y-axis shows the magnitude of a load on a particular gear tooth in pounds of force and the X-axis represents a time period in seconds. The load increases to a first peak magnitude 301 and then decreases to a reduced magnitude 322 during time period 313. The load then increases to a second peak magnitude of 307 and then decreases to a reduced magnitude 328 during time period 317. The load then reaches a third peak magnitude 305 and then decreases during time period 319. The difference between the second peak magnitude 307 and the first and third peak magnitudes 301 and 305, respectively is variance 303. The load variation occurs primarily because the load on the tooth is alternately shared by the preceding tooth, then not shared, then shared by the succeeding tooth on the gear. The peak, 307, occurs when the minimal load sharing occurs. The degree to which load sharing occurs is measured by the contact ratio. The contact ratio may be viewed as the average number of teeth in contact. For example, a contact ratio of 2.5 means that, on average, 2.5 teeth are in contact. The current invention enables raising the contact ratio to the next highest integer i.e. 2.5 can be raised to 3.0. By minimizing this variance 303 the peak load at the pinion is reduced and the vibrational torque is reduced.

Figure 5:
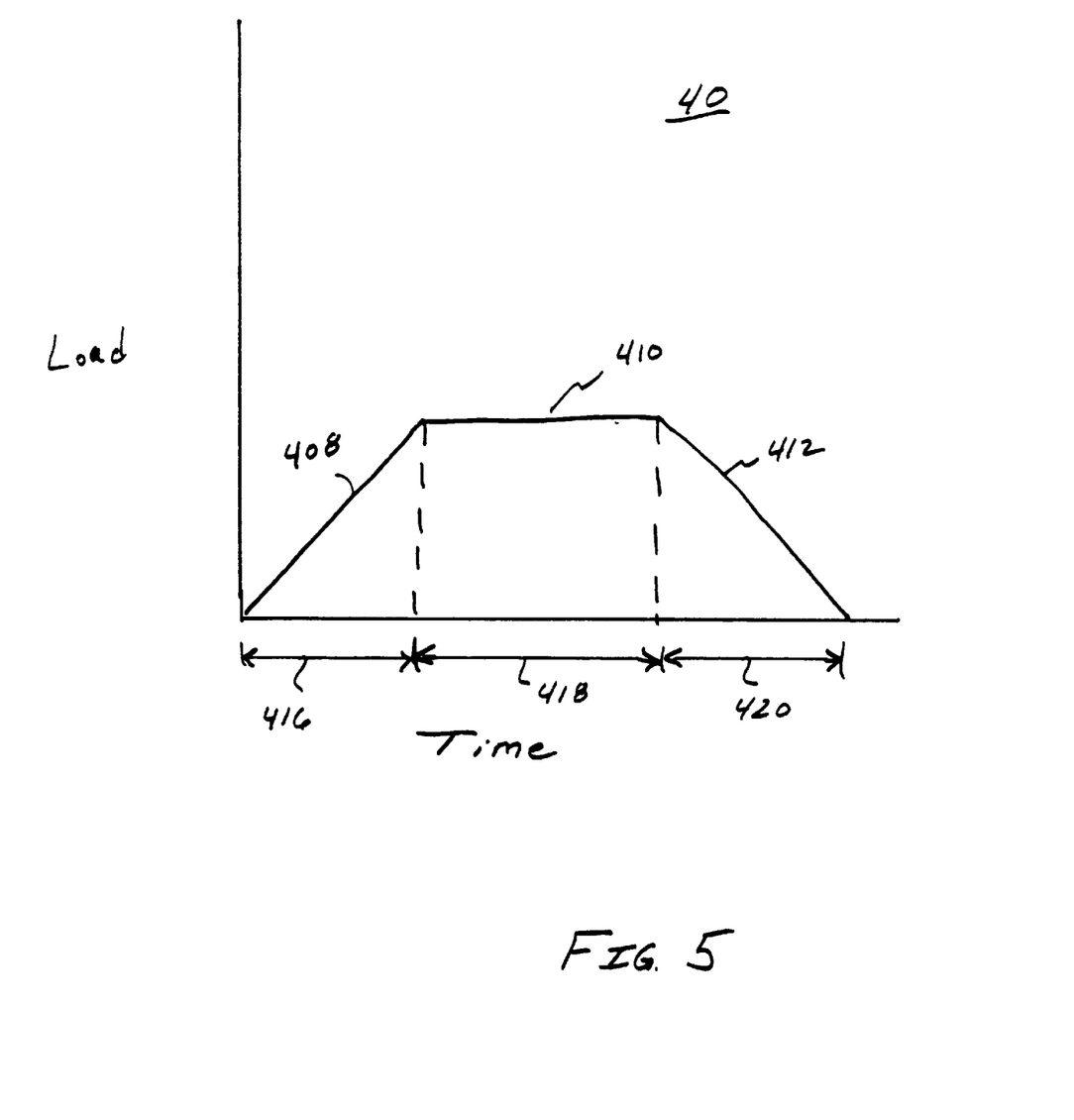
FIG. 5 shows an ideal load distribution on a gear tooth.

FIG. 5 shows a graph 40 of an improved load condition. The magnitude of the load, in pounds, is plotted against the Y-axis and time, in seconds, is plotted against the X-axis. Graph 40 has three portions. Portion 408 shows the loading portion of the gear tooth during time interval 416. Section 410 shows a load on the gear tooth during time interval 418 and section 412 shows release of the load on the gear tooth during time interval 420. Ideally the gear tooth loading should follow the pattern shown in FIG. 5, which is uniform loading and unloading on a gear tooth. By modifying the vibratory torque on a gear tooth the load on each tooth can more closely match that shown in FIG. 5.

Figure 6:
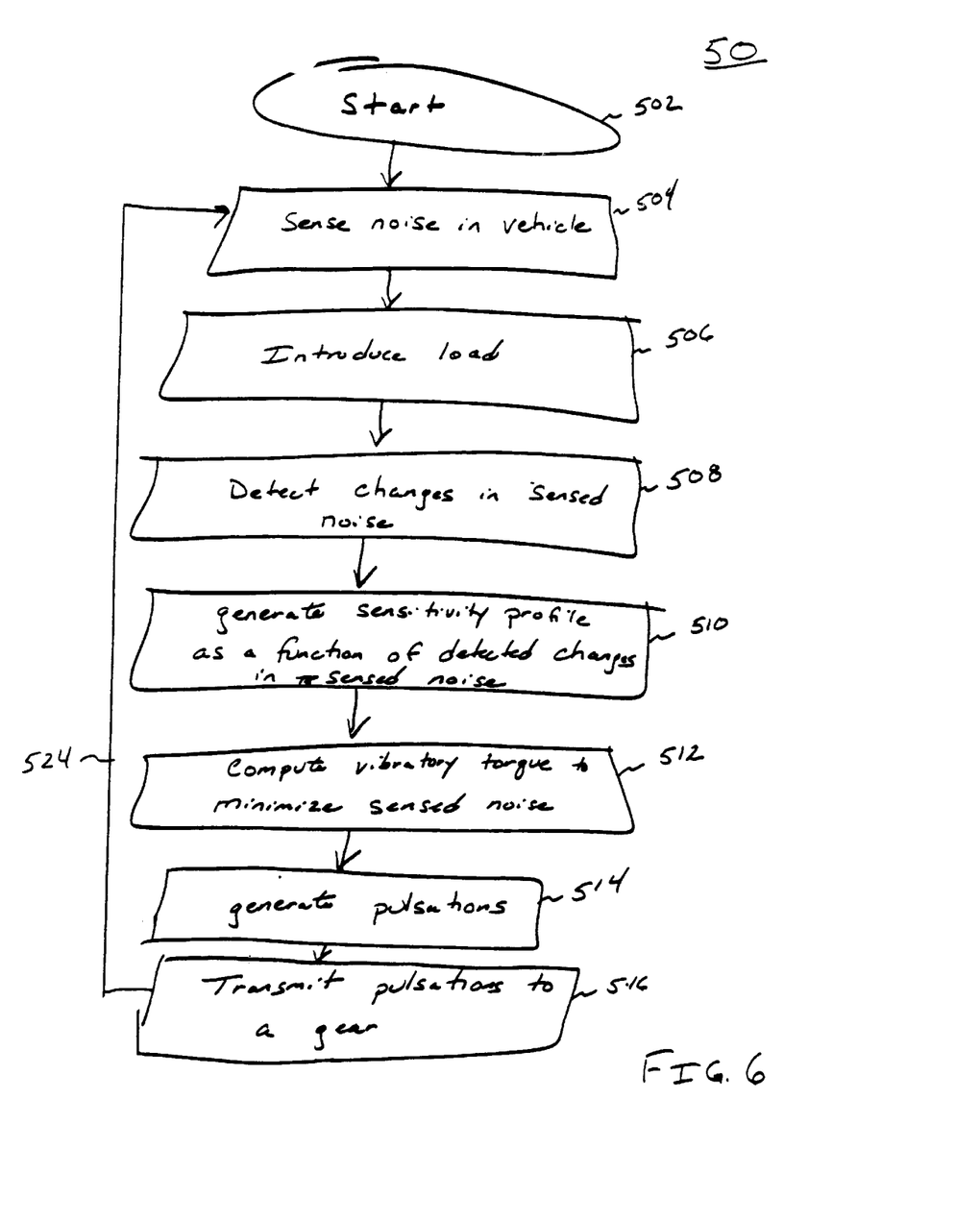
FIG. 6 shows a flowchart of steps to generate a compensating torque.

FIG. 6 shows a flow chart 50 of steps to implement the instant invention. These steps are suitably stored on a computer-readable memory. For example, the steps may be stored in a memory of a control module described above.

Block 502 is a start block. Block 504 shows that noise is sensed in a vehicle. This noise is typically generated by gears meshing in a gearbox that is mounted to a vehicle such as a helicopter. The noise is typically sensed by one or more sensors mounted in either the cabin area of the vehicle or at the airframe or at the gearbox/airframe interface. These sensors are, for example, accelerometers or microphones. Block 506 shows that a load is introduced in the vehicle. This load has a known magnitude and is used to adjust the actuators. Block 508 shows that the sensors detect changes in the noise level of the vehicle. Block 510 generates a sensitivity profile that is a function of the changes detected in block 508. The sensitivity profile (Tk matrix) is capable of being expressed as a discreet quantity. In this step, a load graph is determined based on a sensed change in noise level. Block 512 shows that a vibratory torque is computed to minimize the sensed noise. This vibratory torque is calculated to drive the detected noise to zero. Block 514 shows that pulsations are generated, typically by an actuator, such as an electric motor, to counteract the sensed noise. Block 516 shows that the pulsations are transmitted to a gear. The teeth of a first gear mesh with corresponding teeth of a second gear as a function of the received pulsations.

The process repeats continuously, shown by line 524, to compensate for the errors in the original calculations and for continuous variations in the gearbox torque. These variations are caused by changing flight conditions.

Algorithms used to compute the vibratory torque that is used by the controller to generate a pulsation to drive the noise to a minimum are as follows.

$$u_{k+1} = u_k - \beta Y_k (W_u u_k + T_k^T Z_k) \text{ and}$$

$$Y_k = (T_k^T T_k + W_u + W_{\delta u})^{-1}$$

where:

$u_k$, $u_{k+1}$ are control outputs at two successive times k and k+1, respectively;

$\beta$ is a scaler gain or multiplier;

$W_u$, $W_{\delta u}$ are control weights;

$T_k$ is a matrix of sensitivity coefficients that can be varied in an adaptive manner;

t represents a matrix transpose;

$^{-1}$ represents a matrix inverse operation; and $Z_k$ is a vector of noise or vibration measurement inputs at time K.

Figure 7:
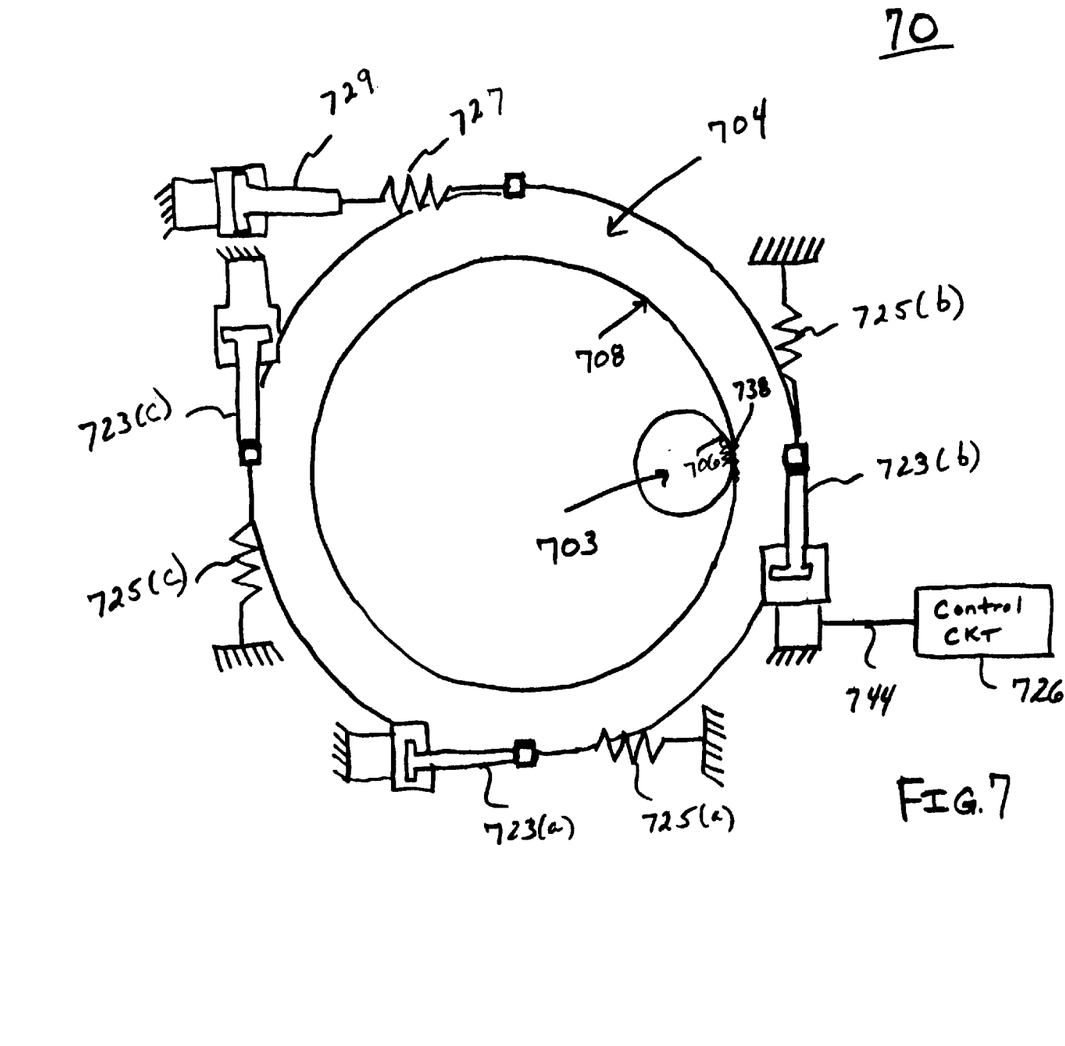
FIG. 7 shows a planatary gear system.

FIG. 7 shows a second embodiment that uses a planetary ring gear system 70. This system 70 includes a ring gear 704 and a planet gear 703. Ring gear 704 has teeth 708 that mesh with planet gear teeth 706 at interface 738. Control circuit 726 controls actuators 723(*a*) . . . (*c*) (generally 723) (Although only three are shown, the number of actuators is any suitable number.) via transmission line 744. Actuators 723 are typically linear actuators, such as electromechanical or hydraulic. Each actuator 723(*a*) . . . (*c*) is coupled to an actuator spring 725(*a*) . . . (*c*), respectively. The control circuit 724 controls the actuators 723, using the algorithms described above, such that actuators 723 produce a predetermined torque pulsation calculated by the control circuit 726. The linear actuators 723 push on ring gear 704 to minimize gear clash impact loads on gear teeth 706 and 708, thereby reducing vibration sensed in a cabin compartment of a vehicle.

Linear actuators 723(*a*) . . . (*c*) joined with springs 725(*a*) . . . (*c*), respectively in series is an appropriate arrangement when the actuators 723(*a*) . . . (*c*) are electro mechanical. This is because electro mechanical actuators generally produce small forces that are insufficient for precise positioning of the ring gear 704 thus necessitating the springs 725. Just as in the arrangement shown in FIG. 2, the ring gear mass can act as a resonant mass with springs 725 to amplify small forces from actuators 723.

An alternate actuator-spring configuration is shown in FIG. 7. Actuator 729 is a position actuator which could be hydraulically powered. Actuator 729 is attached to spring 727 which is attached to ring gear 704. In this configuration, the actuator 729 is capable of reacting to large quasi-steady forces produced by the ring gear 704 and transmitted through spring 727. Again, a resonant system comprising the spring 727 and the ring gear mass 704 can be utilized to amplify the small vibratory loads induced by actuator 729.

Both actuator spring configurations function by causing the ring gear 704 to vibrate in a manner to reduce gear tooth loads between the multiple planets 703 and the ring gear 704.

Figure 8:
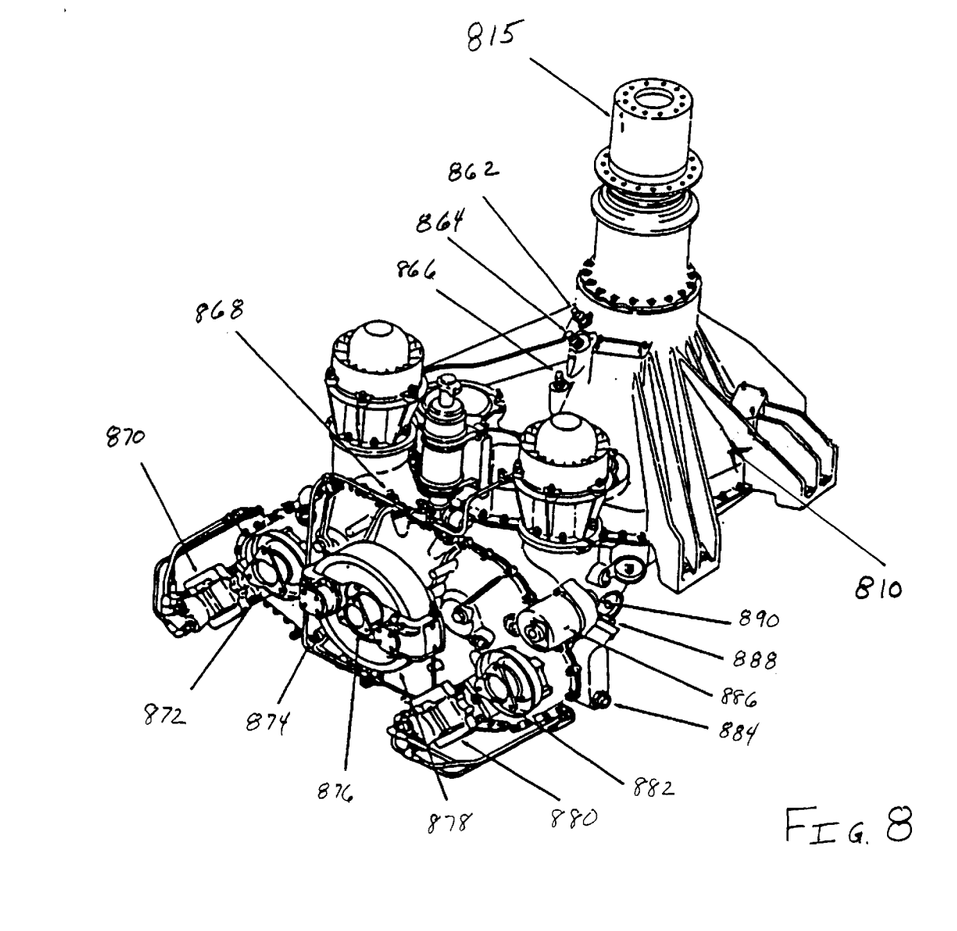
FIG. 8 shows an S-76™ main gearbox.

FIG. 8 shows an S-76™ main gearbox 80. Main rotor shaft 815 is connected to gearbox housing 810, which houses the bull gear and pinion(s) described herein. The other components of the main gearbox include oil pressure transmitter 862, oil temperature warning switch 864, oil inlet port 866, speed sensor 868, first and second stage hydraulic pumps 870 and 880, respectively, number one and number two engine inputs 872 and 882, respectively, low oil pressure warning switch 874, tail takeoff 876, rotor brake 878, oil level sight window 884, oil filters 886 and 888 and oil outlet port 890.

Figure 9:
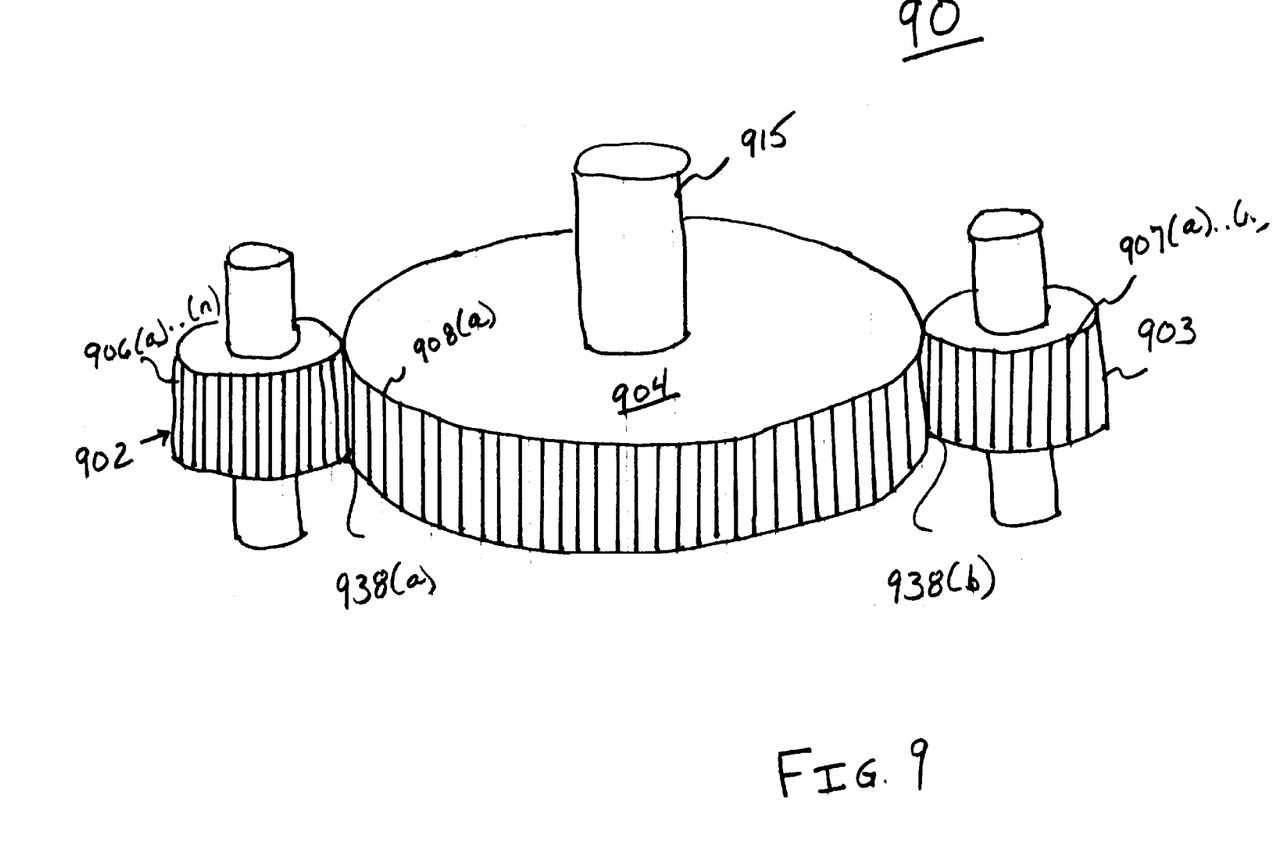
FIG. 9 shows a bull gear and two pinions.

FIG. 9 shows a configuration 90 of a bull gear 904 and two pinions 902 and 903. This embodiment is similar to that described in relation to FIG. 1. First pinion 902 has a plurality of teeth 906(*a*) . . . (*n*) that mesh with bull gear teeth 908(*a*) . . . (*n*) (where n is any suitable number) at interface 938(*a*). Second pinion 903 has a plurality of teeth 907(*a*) . . . (*n*) (where n is any number) that mesh with bull gear teeth 908(*a*) . . . (*n*) at interface 938(*b*). The present invention is used to reduce vibrations at interfaces 938(*a*) and (*b*), and also reduces impulsive loading on the gear teeth of bull gear 904 and pinions 902 and 903. The actuator and other components described in relation to FIG. 1 are not shown in FIG. 9.

The present invention may be incorporated into new production vehicles or retrofitted into existing vehicles.

All of the references cited in the specification are hereby incorporated by reference in their entirety herein.

While the invention has been described above with reference to specific embodiments thereof it is apparent that many changes, modifications and variations can be made herein. Accordingly, it is intended to embrace all such change, modifications and variations that fall within the spirit and broad scope and appended claims.

What is claimed is:

1. An apparatus for reducing noise in a vehicle comprising:
   one or more sensors, mounted on the vehicle, that sense noise in the vehicle;
   a first gear, having a plurality of teeth;
   a second gear, having a plurality of teeth, the second gear disposed such that upon rotation of the first and second gears, certain ones of the second gear teeth mesh with certain ones of the first gear teeth;
   an actuator, coupled to the first gear that drives the first gear and generates torque pulses that are applied to the first gear; and
   a controller, coupled to the actuator that controls the torque pulses that are transmitted to the first gear,
   wherein the torque pulses generated by the actuator are electrically phased and magnitude adjusted so that the first gear teeth vibrate at a predetermined frequency to minimize vibrations caused by the first gear teeth and the second gear teeth meshing.

2. The apparatus according to claim 1, wherein the torque pulses generated by the actuator are electrically phased and magnitude adjusted to minimize gear tooth loading.

3. The apparatus according to claim 1, further comprising a resonant device, coupled to the actuator that produces vibratory compensating torques according to:

$$u_{k+1} = u_k - \beta Y_k(W_u u_k + T_k^t Z_k) \text{ and}$$

$$Y_k = (T_k^t T_k + W_u + W_{\delta u})^{-1}$$

where:

$u_k$, $u_{k+1}$ are control outputs at two successive times k and k+1, respectively;

$\beta$ is a scaler gain or multiplier;

$W_u$, $W_{\delta u}$ are control weights;

$T_k$ is a matrix of sensitivity coefficients that can be varied in an adaptive manner;

t represents a matrix transpose; and $Z_k$ is a vector of noise or vibration measurement inputs at time K.

4. The apparatus according to claim 1, wherein the predetermined frequency is approximately 778 Hertz.

5. The apparatus according to claim 1, wherein electrical power is extracted from the actuator to provide electrical power to the controller.

6. The apparatus of claim 1, wherein the first gear is a planet gear; and the second gear is a ring gear.

7. A method for reducing vehicle vibrations caused by gearbox vibration comprising:
   rotating a first gear, the first gear having a plurality of teeth;
   rotating a second gear, the second gear having a plurality of teeth, such that the first gear teeth and second gear teeth interact to produce impulse loads that are transmitted through support bearings to a gearbox housing and produce impulsive noise;

sensing vehicle vibration generated by the impulsive noise;

generating a command signal as a finction of the vehicle vibration;

transmitting the command signal to an actuator; and generating pulsating torques in response to the command signal;

transmitting the pulsating torques to the first and second gears, thereby reducing the impulse loads.

8. The method according to claim 7, further comprising generating pulsating torques such that the first and second gears vibrate at a frequency of approximately 778 hertz.

9. The method according to claim 7, further comprising, generating pulsating torques to reduce impulsive loading on the gear teeth.

10. The method of claim 9, further comprising calculating the torque pulsations as a function of:

$$u_{k+1} = u_k - \beta Y_k(W_u u_k + T_k^t Z_k) \text{ and}$$

$$Y_k = (T_k^t T_k + W_u + W_{\delta u})^{-1}$$

where:

$u_k$, $u_{k+1}$ are control outputs at two successive times k and k+1, respectively;

$\beta$ is a scaler gain or multiplier;

$W_u$, $W_{\delta u}$ are control weights;

$T_k$ is a matrix of sensitivity coefficients that can be varied in an adaptive manner;

t represents a matrix transpose; and $Z_k$ is a vector of noise or vibration measurement inputs at time K.

11. An apparatus for reducing noise in a vehicle comprising:

sensing means, mounted on the vehicle, for sensing noise;

a first gear, having a plurality of teeth;

a second gear, having a plurality of teeth, the second gear disposed such that upon rotation of the first and second gears, certain ones of the second gear teeth mesh with certain ones of the first gear teeth;

actuator means, coupled to the first gear, for driving the first gear and for generating torque pulses that are transmitted to the first gear; and control means, coupled to the actuator means, for controlling the torque pulses that are transmitted to the first gear, wherein the torque pulses generated by the actuator means are electrically phased and magnitude adjusted so that the first gear teeth vibrate at a predetermined frequency to minimize vibrations caused by the first gear teeth and the second gear teeth meshing.

* * * * *